Patented Jan. 23, 1934

1,944,851

UNITED STATES PATENT OFFICE 1,944,851

MANUFACTURE OF GREEN BLOOM AGENTS

Herschel G. Smith, Swarthmore, Pa., assignor to Gulf Refining Company, Pittsburgh, Pa., a corporation of Texas No Drawing. Application February 9, 1932
Serial No. 591,929

20 Claims. (Cl. 196—1)

This invention relates to manufacture of green bloom agents, and it comprises, as new products, oil compositions containing the active green bloom principle resulting from the heating of petroleum oils in the presence of anhydrous aluminum chloride, said oil compositions also containing clarified residual oils derived from said heating and produced for example, during the distillation of a petroleum oil, advantageously of a naphthenic type, in the presence of anhydrous aluminum chloride, or from the aluminum chloride sludge produced, for example, during the refining of a lubricating oil with aluminum chloride; and it also comprises processes of manufacturing said green bloom agents, said processes comprising heating anhydrous aluminum chloride and a relatively large proportion of oil, with consequent production of heavy residues, decomposing these heavy residues and extracting the active green bloom principle therefrom and clarifying said extract; all as more fully hereinafter set forth and as claimed.

The present application is a continuation in part of my copending application, Ser. No. 381,398, filed July 26, 1929, now U. S. Patent No. 1,868,473. In the latter I describe and claim methods for making green bloom lubricating oils and the products thereby produced. The present application is directed to processes for producing green bloom agents and to the green bloom agents themselves which, when added to a lubricating oil, produce the products claimed in said copending application.

One of the distinguishing characteristics of mineral oils is their fluorescence or dichroism. In fact, with the exception of the lighter distillates such as benzine and ligroin and of the paraffin waxes freed from oil, substantially all petroleum products show fluorescence; that is, the oils show different colors when viewed by transmitted light than when viewed by reflected light. The reflected color is usually known in the art as "bloom".

Lubricating oils which are yellow to red by transmitted light show a bloom which may range from green, through blue to purple by reflected light. The bloom appears to be somewhat independent of the color of the oil by transmitted light. The color of the bloom is not specific to any grade of oil. However, all oils derived from any one locality ordinarily possess similar characteristic bloom. Thus naphthenic oils, such as Russian oils and Texas coastal oils, tend to have a bloom which is predominantly blue, while Pennsylvania oils are noted for their green bloom. But the color of the bloom also depends to a large extent on the processing of the oil. Overhead stocks tend to have a blue bloom while the bloom of residuals tends to be green. Acid treatment followed by fire and steam reduction of a distillate tends to promote the formation of a brownish-blue bloom.

A large amount of empirical information has been collected concerning the action of the bloom when subjected to various treatments. Thus, it is known that the bloom is impaired by the action of concentrated sulfuric acid and that this fact accounts for the usual reduction in bloom during refining; that a blue bloom tends to be amplified by high temperatures in acid treatment; that blue bloom is more easily removed than green bloom by filtration; that bloom can be eliminated or neutralized by the addition of nitro compounds and that the so removed bloom returns on removal of the added substance; that oxidation effects a permanent reduction in intensity or even removal, as does exposure to ultra violet light, etc. The active green bloom principle contained in the green bloom agents of the present invention possesses all of the above described properties. It appears to be similar to or identical with the natural green bloom. To my knowledge I am the first to have produced a concentrated green bloom agent derived from a petroleum source and possessing all the characteristics of the natural bloom.

The bloom of an oil possesses considerable utility aside from imparting a more pleasing appearance to the oil. This utility consists essentially in a greater visibility against a dark or a light background. The bloom effect appears to concentrate in the surface of the oil making such surface more plainly visible. As a matter of increasing visibility and improving the appearance of an oil, green bloom is much superior to a bloom which is blue or of other color. Hence the trade has come to demand oils having a green bloom.

I have found that exceptionally good green bloom agents can be prepared from the so-called aluminum chloride complexes which are formed by heating hydrocarbon oils of various kinds with anhydrous aluminum chloride. Such complexes or sludges are formed, for example, during the refining of petroleum oils with aluminum chloride at temperatures down to about 150° F. They are also formed at higher temperatures, for example, during the distillation of petroleum oils with aluminum chloride at atmospheric pressure and at temperatures up to say 600° F., or even under pressure distillation or mere heating of such oils at temperatures up to 800° F. and at pressures up to 200 pounds per square inch and above. Advantageous results are produced when oils are substantially reduced or distilled to a small residuum in the presence of aluminum chloride and when heating is under conditions producing incipient cracking; at temperatures of from 200° to 600° F., for example. The aluminum chloride-hydrocarbon complexes thus created form a base for producing my green bloom agents. In my process the complex is decomposed by heating or by treating with various chemical agents such as water, dilute sulfuric acid, etc. as hereinafter described. The active green bloom principle liberated by decomposition of the complex is taken up or extracted by any oil which happens to be present. This crude product is then clarified by the use of a centrifuge or by simple sedimentation, for example, to produce my green bloom agent. The oil used for extraction purposes may be added especially for this purpose or it may be the residual oil remaining after the distillation of an oil in the presence of aluminum chloride or after the decomposition of an aluminum chloride sludge. At the higher temperatures mentioned above the complex is formed and later decomposed during the same heating step. A small amount of decomposition of the aluminum chloride "complex" apparently occurs during moderate heating since, after treatment at moderate temperatures with aluminum chloride, an oil when separated from the aluminum chloride sludge usually possesses a green bloom. But the great bulk of the active green bloom principle appears for the first time when the sludge is decomposed, by heating to a higher temperature, for example.

A wide range of petroleum oils are applicable in my process. Practically any type of distillate, when heated with aluminum chloride forms a sludge or complex from which a green bloom agent can be produced under suitable conditions. Even gasoline or kerosene distillates, when strongly reduced or distilled to a small residue, in the presence of aluminum chloride form such green bloom sludges. Similarly, a suitable sludge is formed when heavy lubricating distillates or residuals are heated with aluminum chloride to temperatures of the order of 150° F. or above, as in the usual aluminum chloride refining process or lubricating oils. Residual oils containing asphaltic impurities are not generally suitable in my process for the reason that the asphaltic impurities present would tend to darken any oil to which any substantial proportions of such a green bloom agent were applied.

A sludge suitable for the production of any green bloom agent can be decomposed by heating to temperatures sufficiently high to "coke" the aluminum chloride sludge or by chemical reaction, as mentioned above. In either case sufficient oil should be present to extract the liberated green bloom principle. The oil used for extraction purposes may be the residual oil from the heating step or a light hydrocarbon oil may be added for this purpose.

As stated above, practically all types of distillates and residuals can be employed in my process, but I have found that oils of naphthenic type base, when heated with aluminum chloride, appear to form larger proportions of the desired green bloom principle than do oils of paraffinic type base. For example, the green bloom agent derived from a naphthenic type oil usually is from 2 to 5 times as potent as that derived in a similar manner from a paraffinic type oil. This leads me to believe that the active green bloom principle is a petroleum resin of naphthenic structure. It is highly probable that the same or an analogous compound is responsible for the green bloom which occurs naturally in oils. My process, therefore, does not introduce extraneous matter of non-petroleum source into the oil and probably introduces no hydrocarbon or other compound that is not already present in the oil to some degree.

In producing my green bloom agents I have found that when a distillate, advantageously from a naphthenic base, is reduced in the presence of anhydrous aluminum chloride to a residue representing a small fraction of the whole, a product is obtained which is excellent as a green bloom agent. Addition of this agent in amounts even below one per cent will convert an oil possessing an inferior bloom into a product having a high green bloom.

In a specific embodiment of my invention, a gas oil distillate of naphthenic type, ranging in gravity between 25° and 30° Bé., was charged to a still and subjected to distillation in the presence of from 2.5 to 3 per cent of anhydrous aluminum chloride, by weight on the charge of oil used. The distillation was continued until the oil bottoms, exclusive of coke and solid aluminum chloride hydrocarbon compounds, amounted to about 10 per cent by volume of the charge to the still. During this distillation the green bloom sludge formed originally was decomposed to coke by heating, the active green bloom matter being extracted by the residual oil present.

The bottoms from the above process were cooled down by a pump circulation through a cooling coil and delivered to a storage tank. The time for this particular run amounted to about 60 hours. All suspended aluminum chloride-coke particles were allowed to settle out of the oil which had been delivered to the storage tank, and the so clarified oil was then removed for further use. Alternatively the aluminum chloride-coke might have been completely removed by filtration, by centrifuging or by washing with a little dilute sulfuric acid followed by neutralization. The clarified oil thus produced, which forms the subject matter of the present invention, was a dark brownish-green substance capable of imparting brilliant green bloom to lubricating oils when added thereto in small amounts, usually less than 1 per cent.

While, as stated, I regard the residual oil from an aluminum chloride distillation of naphthenic gas oils as the best source of the bloom producing agent, the sludge resulting from lower temperature treatment of petroleum hydrocarbons with aluminum chloride can be used. For example, lubricating oils may be heated with aluminum chloride at temperatures below their boiling points, say at 200° to 250° F., for improvement in color, with the production of inactive or partially inactive aluminum chloride sludges which are accompanied by some residual oil. Such sludges can be decomposed, for example by chemical treatment, in the presence of an extracting oil, to form my green bloom agents.

In a specific embodiment of the above described process a heavy sludge, resulting from the refining of a bright stock with aluminum chloride at 220° F., was used. This sludge was digested with water and steam to decompose the same, with the formation of an aqueous layer containing aluminum salts and hydrochloric acid. After this digestion a small amount of light gas oil distillate was added and the mixture was repeatedly washed with water to effect complete separation of impurities and extraction of the green bloom principle. After drawing off the aqueous layer, the supernatant oil, comprising the green bloom principle dispersed in the light oil extract, was charged into a still and reduced by fire and steam. The residual oil remaining was a very dark brown material leaving a brown streak when rubbed on paper. It formed a highly potent green bloom agent.

In using the above green bloom agents to impart green bloom to lubricating oils, an acid treated, sour lubricating oil may be neutralized in the usual way by adding caustic soda solution to the oil while transferring it from the acid agitator to the wash tank. After such neutralization the bloom agent can be added in required amount, usually from 0.2 to 0.5 per cent by volume, while stirring. The oil may be then washed and freed from soap by means of agitation with hot water, and then brightened and freed from any small amount of suspended water in the usual way. This washed oil then has the desired brilliant green bloom.

My green bloom agent is impaired by sulfuric acid; that is, its potency is lowered. For this reason I find it desirable to add the agent to acid treated lubricating oil after neutralization with caustic soda or other neutralizing means. The best stage for the addition of the green bloom agent is after this neutralizing treatment. The neutralized, unwashed oil has no action on the agent. The subsequent washing in the presence of a slight excess of alkali not only removes the soaps and scrubs the oil, but also removes any trace of solids and colloidal matter that may be present in the green bloom agent. I find that, if all the solids are not removed from the residual oil before it is used, the additions of the green bloom agent to the finished brightened oil in an appreciable amount sometimes results in the development of a very slight haze. This can be avoided when washing follows the addition of the bloom agent. It can be avoided also by a careful settling of the residual oil from the aluminum chloride distillation, with or without clarification by means of a centrifuge. The so treated residual oil may be added to any finished brightened oil, should it be desired. The amount of green bloom agent required to be added is so small that there is no appreciable effect on the quality of the oil from the standpoint of any of the usual physical tests.

When a distillate from a paraffin or mixed base type crude oil is subjected to aluminum chloride distillation, the green bloom agent derived therefrom contains an appreciable amount of paraffin. This may have a tendency to slightly increase the cold test or the pour test of the lubricating oil to which such a green bloom agent is added. This tendency to increase the cold test is somewhat aggravated by the need for using a larger proportion of such oil to impart the green bloom to lubricating oil than is necessary when using a green bloom agent prepared from a naphthenic type oil. It is possible, of course, to remove the wax from a green bloom agent derived from a paraffin base stock. Such wax can generally be removed by common centrifugal methods after diluting with naphtha and chilling, the dilution required depending on the viscosity. Centrifuging has the added advantage of effectively clarifying the green bloom agent.

The green bloom agent of the type described in this application is, or has the characteristics of, a green bloom imparting hydrocarbon resin, substantially free of asphaltic hydrocarbons of the type classed as asphaltenes. The amount of this green bloom agent required to be added to an oil to impart a satisfactory bloom varies widely with the amount of bloom desired and with the manner of preparation and source of the green bloom agent. Other things being equal the color density of the green bloom agent produced by the reduction process described above varies substantially directly with the extent to which reduction (in the presence of aluminum chloride) is carried out. It is generally desirable to reduce an oil stock until a residuum of from 5 to 15 per cent is obtained. The resulting green bloom agent will have a wide range of viscosities depending both upon the extent of reduction and the type of oil reduced. If a low viscosity hydrocarbon oil is used for extraction purposes during decomposition of the green bloom sludge, a low viscosity green bloom agent results. This light product may be distilled, if desired, to recover a concentrated residue. Satisfactory green bloom agents or concentrates have been produced having viscosities ranging all the way from 40 to 250 seconds at 210° F. on the Saybolt universal viscosimeter.

My green bloom agent itself is sensitive to light, but there are no appreciable changes in the green bloom of a lubricating oil containing the same due to the action of light, or any change is so gradual (due probably to the extreme dilution) that no practical trouble is experienced from this standpoint.

To summarize, my green bloom agent is a dark brownish-green colored oil, having widely varying viscosities and is impaired by the action of sulfuric acid. It is my belief that it contains, as the active green bloom principle, a petroleum resin of naphthenic structure. It is substantially free from asphaltic hydrocarbons of the type classed as asphaltenes. As is characteristic of the so-called resins from petroleum, my green bloom agent acts to some extent as a "crystal poison", so-called, that is, it tends to suppress the formation of a wax gel in paraffin type oils and hence to reduce the pour test or solidification temperature of such oils. It has the corresponding property of acting as a wax modifier in rendering the semi-crystalline wax contained in lubricating oils centrifugeable. It also has the characteristic property of imparting a brilliant green bloom to hydrocarbon oils when added thereto in concentrations ranging from about 0.2 to 5.0 per cent.

From the above description various methods of operating my invention will be immediately evident to those skilled in the art. Various departures from the specific details of the procedures described are possible. Practically any type of petroleum oil when heated with aluminum chloride results in the formation of a sludge from which my green bloom agents can be prepared. The active green bloom principle can be produced from this sludge by decomposition in various ways. The active principle can then be taken up or extracted with any type of hydrocarbon oil, such as naphtha, benzol or kerosene. When produced by a reduction process it is usually convenient to leave sufficient residual oil present to act as the extraction and carrying agent. The proportion of aluminum chloride used in the reduction process is not important; from 2 to 5 per cent is advantageous.

What I claim is:

1. As a new product, an oil soluble green bloom agent comprising a clarified hydrocarbon oil containing the oil dispersible, green bloom principle resulting from the heating of anhydrous aluminum chloride with petroleum oils, said agent being of brownish-green color and having the property of imparting a brilliant green bloom to oils when added thereto in small proportions.

2. As a new product, a green bloom agent comprising a clarified hydrocarbon oil containing the oil dispersible, green bloom principle extracted from the decomposition products of an aluminum chloride sludge formed by heating aluminum chloride with petroleum oil, said agent being of brownish-green color and having the property of imparting a brilliant green bloom to oils when added thereto in small proportions.

3. As a new product, a green bloom agent comprising a clarified hydrocarbon oil containing the active green bloom principle resulting from the distillation to a small residuum of a naphthenic type petroleum oil in the presence of anhydrous aluminum chloride, said agent being of brownish-green color and having the property of imparting a brilliant green bloom to oils when added thereto in small proportions.

4. As a new product, a green bloom agent comprising the active green bloom principle resulting from the decomposition of a sludge formed by heating petroleum oils in the presence of anhydrous aluminum chloride, said green bloom agent also containing a clarified residual oil derived from distilling a petroleum oil in the presence of anhydrous aluminum chloride, said agent being of brownish-green color and having the property of imparting a brilliant green bloom to oils when added in small proportions.

5. The product of claim 4 in which said clarified residual oil is derived from a naphthenic type petroleum oil.

6. The product of claim 4 in which said clarified residual oil is derived from a 5 to 15 per cent residuum remaining after distillation of a naphthenic type gas oil.

7. As a new product, a green bloom agent comprising a clarified residual oil derived by distilling to a small residuum a naphthenic type petroleum oil in the presence of aluminum chloride, said agent being of brownish-green color and having the property of imparting a brilliant green bloom to oils when added thereto in small proportions.

8. As a new product, a green bloom agent comprising a 5 to 15 per cent residue derived by distilling a naphthenic type gas oil in the presence of aluminum chloride, said agent being of brownish-green color and having the property of imparting a brilliant green bloom to oils when added thereto in small proportions.

9. As a new product, a green bloom agent comprising a residual oil derived by distilling to a small residuum a naphthenic type petroleum oil in the presence of about 2 to 5 per cent aluminum chloride, said agent being of brownish-green color and having the property of imparting a brilliant green bloom to oils when added thereto in small proportions.

10. As a new product, a green bloom agent comprising a clarified residual oil derived by distilling a naphthenic type gas oil to from 5 to 15 per cent of its original volume in the presence of about 2 to 5 per cent of aluminum chloride, the said green bloom agent being a dark brownish-green color, being impaired by action of sulfuric acid and having the characteristic property of reducing the cold test of lubricating oils when added thereto and of imparting a brilliant green bloom to said oils in concentrations ranging from about 0.2 to 0.5 per cent.

11. In the production of green bloom agents, the process which comprises heating aluminum chloride with a relatively large proportion of a petroleum oil, decomposing the resulting heavy residues in the presence of a relatively small proportion of hydrocarbon oil, separating the aluminum chloride residues and clarifying the hydrocarbon oil containing the resulting active green bloom principle.

12. In the production of green bloom agents, the process which comprises heating aluminum chloride with a relatively large proportion of a petroleum oil, decomposing the heavy residues, extracting the active green bloom principle from said residues and clarifying said extract.

13. The process of claim 12 in which the said petroleum oil is of a naphthenic type.

14. The process of claim 12 in which said heavy residues are decomposed chemically.

15. The process of claim 12 in which said petroleum oil is distilled to a small residuum during heating.

16. The process of claim 12 in which the active green bloom principle is extracted with a light hydrocarbon oil, the extract being thereafter distilled to recover a residuum.

17. In the production of green bloom agents, the process which comprises heating a petroleum oil with a small amount of aluminum chloride at low cracking temperatures, decomposing the heavy residues, separating the aluminum chloride residues and clarifying the residual oil containing green bloom principle.

18. In the production of green bloom agents, the process which comprises distilling to a small residuum a naphthenic type gas oil in the presence of a small amount of aluminum chloride, separating the aluminum chloride residues thereby formed and clarifying the residual oil containing green bloom principle.

19. In the production of green bloom agents, the process which comprises reducing a naphthenic type petroleum stock in the presence of from 2 to 5 per cent of aluminum chloride to from 5 to 15 per cent of its original volume, separating aluminum chloride residues and clarifying the residual oil containing green bloom principle.

20. As a new product, a green bloom agent comprising a clarified hydrocarbon oil containing the active green bloom principle resulting from the decompositon of an aluminum chloride sludge formed in the aluminum chloride refining of a petroleum oil, said agent being of brownish-green color and having the property of imparting a brilliant green bloom to oils when added thereto in small proportions.

HERSCHEL G. SMITH.

CERTIFICATE OF CORRECTION.

Patent No. 1,944,851.  January 23, 1934.

HERSCHEL G. SMITH.

It is hereby certified that error appears in the printed specification of the above numbered patent requiring correction as follows: Page 2, line 58, for "any" read my; and that the said Letters Patent should be read with this correction therein that the same may conform to the record of the case in the Patent Office.

Signed and sealed this 27th day of February, A. D. 1934.

F. M. Hopkins (Seal)  Acting Commissioner of Patents.